Patented Apr. 23, 1935

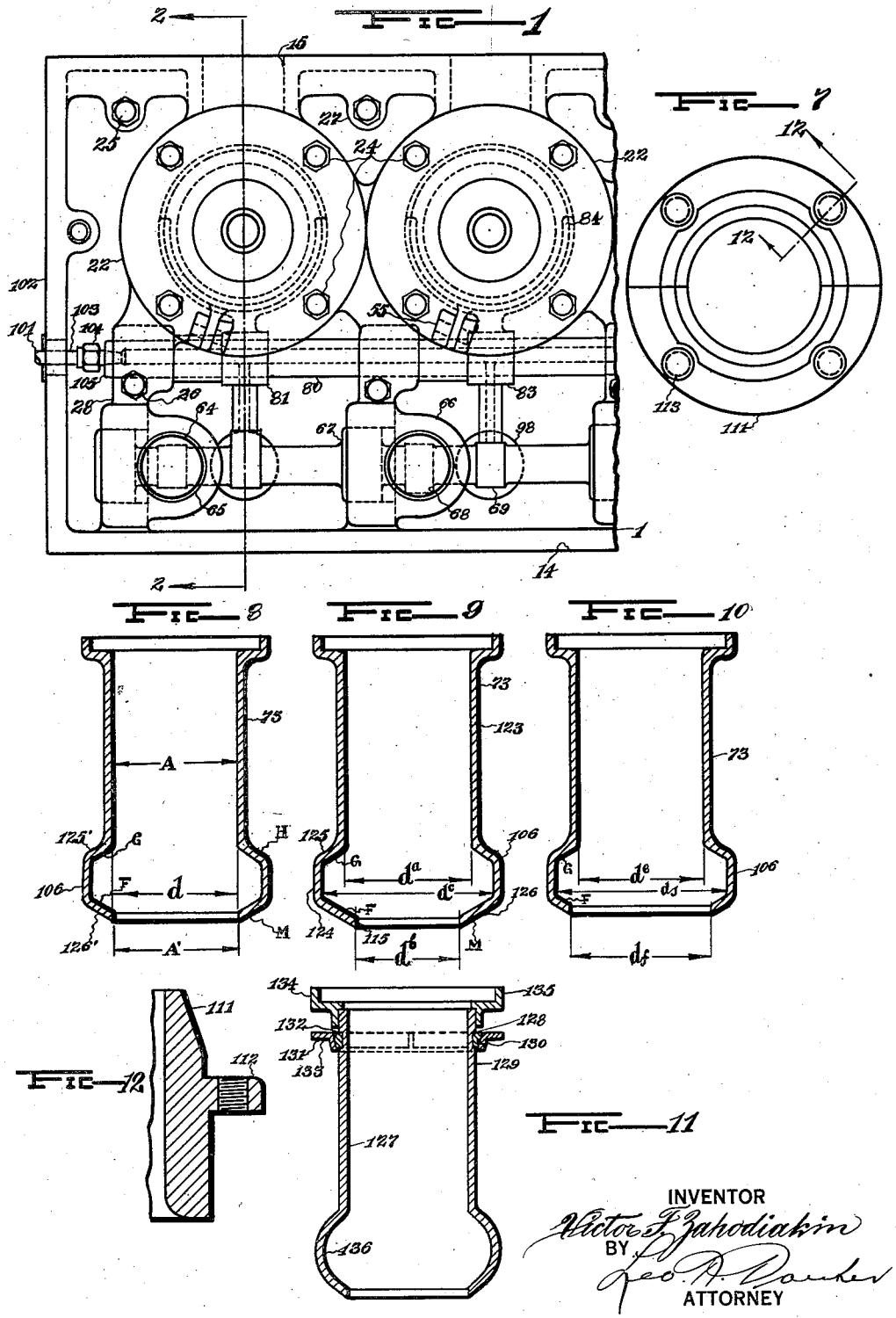

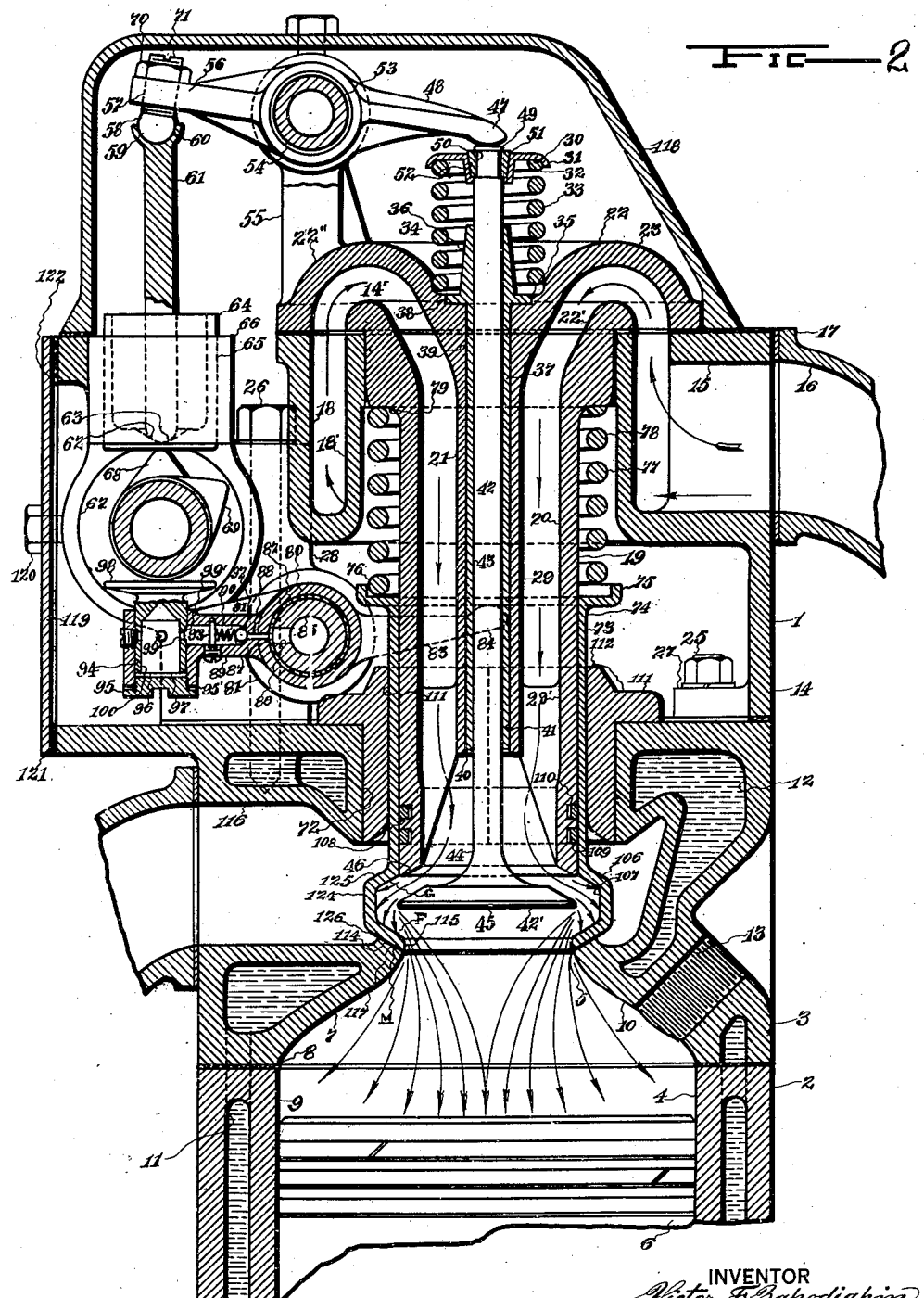

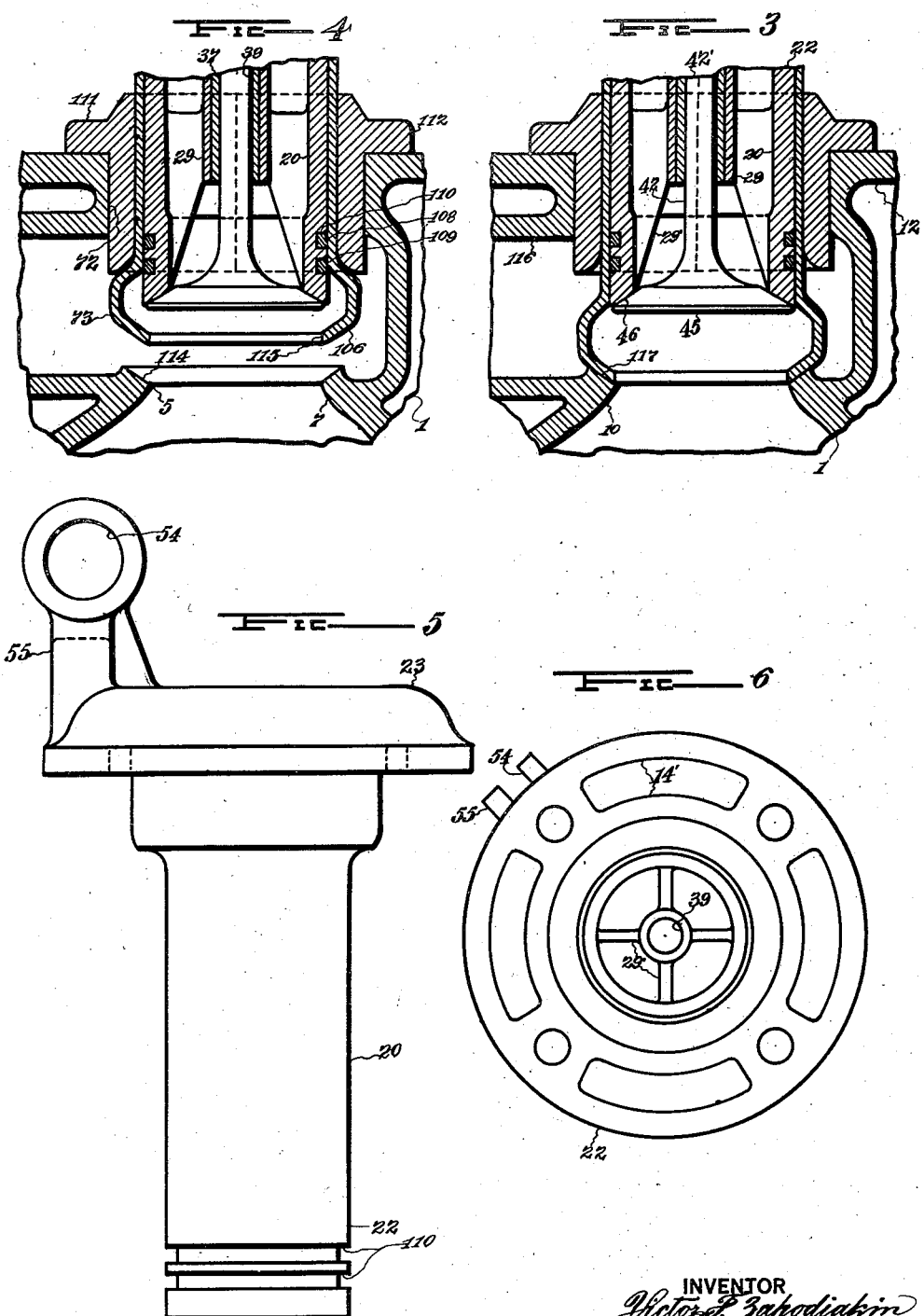

1,998,601

UNITED STATES PATENT OFFICE 1,998,601

INTERNAL COMBUSTION ENGINE

Victor F. Zahodiakin, Cincinnati, Ohio

Application August 31, 1933, Serial No. 687,660

8 Claims. (Cl. 123—79)

The invention relates to improvements in internal combustion engines and is particularly directed to the construction of the valves thereof.

It is the general object of this invention to obtain more efficient engine operation by the provision of an improved valve and valve mounting the use of which results in greater durability, greater power, better acceleration, exhaust valve temperature control, internal evaporation of fuel by exhaust valve head, as well as uniformly controlled temperature of the piston head; greater volumetric and thermal efficiency, better scavenging, and reduction of axial gas pressure on exhaust valve to zero.

It is well known that in the operation of conventional poppet valve internal combustion engines, it has been found that overheating of the valves, particularly the exhaust valve head, has resulted in considerable losses in engine efficiency. The overheating of the exhaust valve head causes flash or premature explosion of the combustion mixture, and results in the so-called "knock" or detonation which causes vibration, loss of power and general destruction of the engine, as well as overheating of the exhaust valve, and produces locally overheated gas pockets, which cause detonation, overheating of the engine, vibration and many other defective actions of the engine. In the invention the internal area of the exhaust valve head is so arranged, with respect to the inlet valve head, which in this type of valve structure is concentric and positioned within the exhaust valve, as to apply selected axial gas pressure to the exhaust valve head in either direction or bring axial gas pressure on exhaust valve head to zero in any cycle of the engine. Consequently this structure permits an exhaust valve of greater size with negligible vibration, thereby increasing the normal power of the engine.

The valve of the present invention is of concentric type. However, either of the valves operate independently and individual timing is provided for the valves. The opening of the inlet valve in the chamber of exhaust valve head is arranged in such way that the velocity of an incoming charge is variable and first contacts an outwardly flared wall of the exhaust valve and proceeds through a constricted opening of the valve, whereby any particles of fuel which may enter in liquid form are deposited on the wall leading to the constricted wall of the exhaust valve until evaporation is completed or the liquid may drop to the center of the piston head without contacting the cylinder walls and will be evaporated and exploded without diluting the lubricating oil on the cylinder walls. The structure and arrangements of the exhaust and inlet valves is such that the incoming charge of fuel uniformly cools the exhaust valve stem and head and, cooling of these parts may be controlled by variable angles of the exhaust valve head and the size of the flared portion and constricted and restricted opening of the exhaust valve.

Therefore, the objects of the invention are to provide simple, practical and efficient means whereby the temperature of the exhaust valves may be automatically controlled; to provide means to control the pressure of the gases in the combustion chamber with respect to the exhaust valve; to provide means whereby the pressure within the cylinder is utilized to assist in opening the exhaust valve or assist in contacting of the exhaust valve; to provide means to increase the normal power of an internal combustion engine; to provide means whereby the inlet charge enters the cylinder and the exhaust charge leaves the cylinder directly above the center of the piston; to provide means to shield the exhaust valve guide from contact by exhaust gases which pass from the cylinder; to provide means whereby the inlet charge passes in direct contact with the exhaust valve whereby the fuel charge is adapted to be properly evaporated; to provide means whereby the usual construction of internal combustion engines is improved so as to effect great simplicity, durability and high efficiency of the engine; to provide means whereby the temperature of the exhaust valve heads and their seats may be controlled; to provide means adapted to render said engine relatively silent while operating, durable and effective for creating maximum power; to provide means adapted to cause said engine to operate dependably without the necessity of frequent replacements of parts or repairs of the exhaust valves; to provide means whereby said engine is relatively compact and capable of being assembled quickly and conveniently; and to provide means whereby the cam is automatically retained in continuous contact with the cam plunger whereby noise is eliminated.

Other objects and further advantages will be more fully apparent from a description of the accompanying drawings, in which:

In the drawings:

Fig. 1 is a fragmentary top view of an internal combustion engine with parts removed;

Fig. 2 is a sectional view taken on a line corresponding to 2—2 in Fig. 1;

Fig. 3 is a fragmentary vertical sectional view taken through the valve mechanism showing the position of the valves during the explosion and compression strokes of the engine;

Fig. 4 is the same as Figure 3 showing the position of the valves during the exhaust stroke of the engine;

Fig. 5 is a side elevational view of the exhaust valve inner guide;

Fig. 6 is a bottom view of the same;

Fig. 7 is a plan view of the outer exhaust valve guide;

Fig. 8 is a central vertical sectional view of the exhaust valve;

Fig. 9 is the same as Figure 8, showing a modified form of exhaust valve;

Fig. 10 is the same as Figure 8, showing another modified form of the exhaust valve;

Fig. 11 is the same showing still another modified form of the exhaust valve; and Fig. 12 is a sectional view taken on a line corresponding to 12—12 in Fig. 7.

The preferred construction of the invention is exemplified in connection with the internal combustion engine 1 comprising the usual engine block 2 having the engine head 3 suitably fixed thereto. The block 2 is provided with the usual cylinder or cylindrical bore 4 which is in axial alignment with the cylindrical bore or port 5 in the head. In the cylinder 4 is slidably fitted the usual reciprocating piston 6 having connected thereto a usual connecting rod (not shown) which has its lower end connected with a usual crank shaft (not shown).

The bore 5 is smaller in diameter than the cylinder 4. The inner walls 7, of the head 3, are inclined downwardly and outwardly and their lower edge 8 is aligned with the walls 9 of the cylinder and form the combustion chamber 10.

The engine block 2 and the engine head 3 have therein the usual water jackets 11 and 12, respectively. The hole 13, in the head 3, receives the usual spark plug (not shown).

Fixed to the top of the engine head 3 is the valve housing 14 having formed therein the intake port 15 which registers with the hole 16 in the usual intake manifold 17 suitably secured to the outer side of the valve housing. The valve housing 14 extends inwardly and has at its top the vertical spaced apart walls 18 forming a chamber 18' which communicates with the port 15. The vertical tubular downwardly extending body 19 has therein a circular hole or chamber 20 into which is received the vertical tubular body portion 21 of the pressure housing or guide 22 whose top 23 is curved outwardly and is secured to the housing 14 as by the bolts 24 shown in Fig. 1. The body 19 is integrally formed with the lower wall 22', of the top 23, which is spaced from the top wall 22'' forming the chamber 14' which communicates with the chambers 18' and 20.

The housing 14 is secured to the top of the engine head 3 as by the bolts 25 and 26 which extend through the inwardly projecting boss 27 and the support 28, respectively, integral with the pressure guide 22.

The tubular body 19, of the pressure guide 22, has centrally disposed therein the downwardly extending valve guide support or casing 29 which is integrally formed with the top 23 of the pressure housing 22. The webs 29' connect the support 29 with the guide 22.

Received in the lower cup portion 30 of the spring retainer 31 is the upper end 32 of the intake coil spring 33 which has its lower end 34 received in the depression 35 centrally disposed in the top 23 of the pressure housing 22. The coil spring 33 surrounds the upper end 36 of the intake valve guide 37 which has integrally formed therewith the outwardly extending flange 38 which is received in the depression 35.

The intake valve guide 37 is received in the hole 39 in the valve guide support 29. The lower end 40 of the support 29 is slightly higher than the end 41 of the guide 37. The intake valve stem 42, of the valve 42', is slidably mounted in the vertical hole 43 in the valve guide 37 and has integrally formed with its lower end 44 the intake valve head 45. During the intake stroke of the piston 6 the intake valve head 45 is in the position shown in Fig. 2, whereas during the compression, explosion and exhaust strokes of the piston the valve head 45 contacts its seat 46, as shown in Fig. 3, which is formed on the lower end of the tubular body 19, of the pressure guide 22.

The desired movement of the intake valve 42' is supplied by contact of the inner end 47, of the rocker arm 48, which forces the valve 42' and its head 45 into the downward position, shown in Fig. 2, during the intake stroke of the piston, whereas during the compression, explosion and exhaust strokes of the piston 6, the end 47 of the rocker arm 48 assumes an upward position which permits the intake coil spring 33 to exert upward pressure against the spring retainer 31 thereby imparting upward movement to the valve 42', which forces the valve head 45 in contact with its seat.

In the upper end 49 of the valve stem 42 is the groove 50 into which is fitted the split washer 51 having its outer side inclined inwardly and downwardly and being received in the centrally disposed hole 52 in the spring retainer, whereby the spring retainer 31 is retained in fixed position.

The hollow horizontal intake rocker arm shaft 53, which extends longitudinally above the engine head 3 and the pressure guide 22, is received in the bearings 54 and supported by the upwardly extending supports 55 which are integrally formed with the tops 23 of the pressure guides 22 which are fixed to the housing 14.

The rocker arm 48 is fixed to the shaft 53 and has in its rear end 56 the threaded hole 57 into which is threaded the bolt 58 having integrally formed with its lower end the ball 59 which fits into the socket 60 formed in the upper end of the push rod 61 which has its lower end 62 received in the depression 63 in the hollow guide 64 which is slidably mounted in the hole 65 formed in the upper portion of the support 66.

Rotatably mounted on the head 3 is the cam shaft 67 having the intake and the exhaust cams 68 and 69 integrally formed thereon. Suitable means are provided for connecting the cam shaft 67 with the usual crank shaft (not shown) of the engine for the purpose of rotating the cam shaft.

In order to secure the bolt 58 in properly adjusted position, for the purpose of obtaining efficient operation of the various connected and movable parts, the nut 70 is threaded to the upper end 71 of the bolt 58 and is screwed in close engagement with the top surface of the rear end 56 of the rocker arm.

Contact of the intake cam 68 with the bottom of the guide 64 forces the guide and the rod 61 upwardly, whereby the rear end 56 of the rocker arm 48 is forced upwardly, to the position shown in Fig. 2, and simultaneously the front end 47 of the rocker arm 48 contacts the upper end of the valve stem 42 and forces the intake valve 42' downwardly to the position shown in Fig. 2.

The tubular body 19 of the pressure guide 22 extends downwardly and is centrally disposed in the circular hole 72 formed in the engine head 3. Surrounding the body portion 19 is the exhaust valve 73 which has formed on its upper end 74 the flange 75 to provide a spring retainer into which fits the lower end 76 of the exhaust coil spring 77 having its upper end 78 in contact with the shoulder 79 formed at the upper end of the body portion 19 of the guide 22.

Extending from one end to the other end of the engine head 3 is the exhaust rocker arm shaft 80. The shaft 80 is mounted on the boss 81 which is integral with the valve housing 14. The shaft 80 has rotatably mounted thereon the exhaust rocker arm 83 whose inner end 84 is adapted to contact the lower surface of the outwardly extending flange 75 integral with the upper end 74 of the exhaust valve 73.

The shaft 80 has therethrough a hole 85. The hole 86 in its side wall registers with the holes 87 and 88 which are formed in the bushing 82 and the rear or outer end 89 of the rocker arm. The holes 87 and 88 communicate with the recess 90 which is formed in the rear end of the rocker arm 83. In the recess 90 is the coil spring 91 whose inner end contacts the ball 92 which normally is adapted to contact its seat formed around the hole 88 in the arm. The other end of the coil spring contacts the pin 93 which is screwed into the rocker arm. Formed at the outer end of the rocker arm 83 is the boss having therethrough the passage 94 in the lower end of which is screwed the plug 95. Between the plug 95 and lower portion of the outer end of the rocker arm are a plurality of plates 95' which may be removed or added for the purpose of adjusting the plug 95 with respect to the plunger 97 and the cam shaft so that proper clearance is provided in event of failure of oil pressure normally developed by the engine oil pump. Slidably received in the passage 94 is the lower end 96 of the plunger 97 having integrally formed with its upper end the circular plate 98. The recess 99 in the rear outer end of the rocker arm 83 communicates with the holes 99 and circular groove 99' in the plunger 97 which communicates with the orifice 100 through the holes 99 formed in the plunger.

The tube 101, shown in Fig. 1, passes through the end 102 of the housing 14 and has its inner end 103 fixed, as by the nut 104, to the outer end 105 of the exhaust rocker arm shaft 80. The tube 101 is operatively connected with the usual oil pump (not shown) of the internal combustion engine, whereby oil is continuously forced, during operation of the engine, through the hole 85 in the exhaust rocker arm shaft 80, whereby the oil is forced through the holes 86, 87 and 88 into the recess 90, since the normal pressure of the oil is sufficiently high to overcome the tension of the coil spring 91, whereby the ball 92 is forced from contact with its seat thereby permitting entrance of the oil into the recess 90. The oil is forced from the recess 90 around the circular groove 99' and through the holes 99 and into the orifice 100. The downward pressure of the oil is exerted against the inner or top surface of the plug 95, whereas the upward pressure of the oil forces the plunger upwardly thereby retaining the cam plate 98 in continuous contact with the exhaust cam 69, thereby eliminating the necessity of usual adjustment and necessary clearance which ordinarily results in tapping noises when the cam contacts a cam plate which is not retained in close contact with the shaft and its cam.

The lower end or exhaust valve head 106 of the exhaust valve 73 is enlarged, whereby when the intake valve 42' is in an open position, as shown in Fig. 2, the fuel charge passes from the intake manifold 17 through the intake port 15, which communicates with the passage 18', which is between the walls 18 of the housing 14, thence upwardly through the chamber or passage 14', in the pressure guide 22, and downwardly through the chamber 20 in the body portion 19 of the pressure guide 22; between the intake valve head 45 and its seat 46; through the chamber 107 in the enlarged head 106 of the exhaust valve 73; and into the combustion chamber 10.

The usual expansion rings 108 and 109 are fitted into the spaced apart grooves 110, formed in the lower outer side of the body portion 19 of the pressure guide 22, whereby escape of the fuel charge or other gases upwardly between the inner side of the exhaust valve 73 and the body portion 19 is prevented.

Received in the hole 72, in the head 3, is the exhaust valve guide 111 which is split for the purpose of permitting the valve guide to be inserted around the exhaust valve 73. Integrally formed with the outer and upper side of the exhaust valve guide is the outwardly extending flange 112 (Fig. 12) through which is received the bolts 113 which fix the valve guide in stationary position with respect to the engine head 3.

The intake cam 68 and the exhaust cam 69 are positioned on the camshaft 67 so that the downward movement of the inner end 47 of the intake rocker arm 48 is timed to force the intake valve downwardly to the position shown in Fig. 2, during the intake stroke of the piston, at the same time that the exhaust cam 69 is out of contact with the circular cam plate 98, whereby the exhaust coil spring 77 is adapted to urge the exhaust valve 73 downwardly with its head 106 in contact with the seat 114 formed in the engine head 3, at the top of the bore 5, thereby, as previously explained, permitting the fuel charge to pass from the chamber 20, in the body portion 19 of the pressure guide 22, through the chamber 107, in the enlarged exhaust valve head 106, and through the bottom hole 115 of the valve 73 into the explosion or combustion chamber 10 of the engine.

The exhaust outlet 116 communicates with the manifold 117.

Passage of the fresh charge of fuel through the chamber 20 tends to reduce the temperature of the exhaust valve head 106. Also, the area of the port 5, from which the exhaust or burned gases escape from the combustion chamber 10 of the engine into the exhaust port 116, may be relatively large whereby the power required to force the burned gases from the combustion chamber is relatively small and these gases escape almost instantly.

Referring to Fig. 4, during the period that the exhaust valve cam 69 contacts the plate 98, whereby the plunger 97 is forced downwardly in contact with the oil which forces the plug 95 and the rear end of the rocker arm 83 downwardly, causing the end 84 of the rocker arm 83 to exert upward pressure against the outwardly extending flange 75, integral with the exhaust valve 73, the intake valve cam 68 is out of contact with the lower end of the guide 64 whereby the coil spring 33 is permitted to exert pressure upwardly against the spring retainer 31 for the purpose of forcing the valve head 45 in contact with its seat for the purpose of closing the entrance into the chamber 20, so that the burned fuel gases cannot enter the chamber during the exhaust stroke of the piston.

Now referring to Fig. 3, the compression is retained in the cylinder 4 during the compression and explosion strokes of the piston at which time the exhaust cam 69 is removed from contact with the plate 99, whereby the spring 77 exerts downward pressure on the valve 73 thereby seating the valve head 106 and closing the passage 117 from the combustion chamber 10 to the outlet 116, at the same time the valve head 45 contacts its seat to close communication between the combustion chamber 10 and the chamber 20.

For the purpose of preventing entrance of foreign matter such as dirt on the upper mechanism the cover 118 is secured to the top of the valve housing 14. Also, the plate 119 is secured, as by the bolt 120, to the side 121 of the engine and closes the opening 122 which gives access to the exhaust rocker arm 83 and associated mechanism.

In Figs. 2 and 9 are shown similarly constructed exhaust valves 73 of which the hollow stem 123 and the bottom 124, of the head 106, are constricted with respect to the head 109 which is enlarged and with the bottom opening 115 having less area than the area of the stem 123. The enlarged head 106 comprises the integrally formed walls 124, 125 and 126, of which the wall 124 is vertical and parallel with the stem 123 and the wall 125 is inclined downwardly and outwardly and the wall 126 is inclined downwardly and inwardly. The bottom surface M of the wall 125 contacts the seat 114.

During the compression and explosion strokes of the piston 6 the downward pressure against the inner surface F of the wall 126 is greater than the upward pressure against the inner surface G of the wall 125 because the area of the wall 126 is greater than the area of the wall 125 whereby the pressure of the gases, during the compression and explosion strokes, holds the valve head 106 in contact with its seat 114.

Fig. 8 represents a vertical cross section of a modified form of the exhaust valve in which the area of the upper bore A is equal to the area of the lower bore A', since the diameter of these bores is the same at all points and the upper and lower angular walls F and G, respectively, of the sides 125' and 126' effected by pressure are balanced. The axial pressure which could be effected by internal pressure of the engine is equal to $d^2 \times .7854 \times P$, of which $d$ is diameter of the bore in the valve head and P is the internal gas pressure. The projected area which could be effected by gas pressure is completely rest on the pressure valve guide 22 and consequently the opening or closing of the exhaust valve in this case will be completely dependent on the spring tension which is in these formulas marked by W.

The surface M of the wall 126' seats in a seat on the cylinder head and with respect to the area of the surface H, there may be a slight variation which may be disregarded since these outer surfaces are subject to the atmospheric pressure of 14.7 lb. per sq. inch.

Fig. 9 is a vertical cross section of the exhaust valve 73 illustrating a variable size of the bores. The bore $d^a$ is larger than the bore $d^b$ and in this instance pressure of the gases effecting opening of the exhaust valve will be equal to $$[(d_c^2 \times .7854 - d_b^2 \times .7854) - (d_c^2 \times .7854 - d_a^2 \times .7854)] \times P,$$

of which P equals the pounds per square inch pressure in the combustion chamber 10 and $d_c$ equals the internal diameter between the walls 124. Therefore, the power necessary to open the exhaust valve 73 is equal to $$P_a = \{[(d_c^2 \times .7854 - d_c^2 \times .7854) - (d_b^2 \times .7854 - d_a^2 \times .7854)] \times P\} + W,$$

in which P equals pressure in pounds per square inch and W is the spring tension.

Fig. 10 is a vertical cross section of another modified form of the exhaust valve in which the bore $d^e$ is smaller than the bore $d^f$ and therefore the power required to open the exhaust valve equals $$P_a = W - \{[(d_i^2 \times .7854 - d_e^2 \times .7854) - (d_i^2 \times .7854 - d_f^2 \times .7854)] \times P\}.$$

The valves shown in Figs. 9 and 10 are subject to external and internal pressure similarly to the valve shown in Fig. 8.

In Fig. 11 is shown another modified form of the exhaust valve 127 having the groove 128 whose walls extend circumferentially adjacent the top of the stem 129. Fitted in the groove 128 is the split washer 130 having its outer side inclined inwardly and downwardly. Received around the washer 130 is the exhaust rocker arm contact ring 131 whose inner flanged side 132 contacts the outer inclined side of the washer and is parallel thereto whereby upward movement of the ring 131 as by contact of the exhaust rocker arm is prevented. The inner end 84 of the rocker arm 83 is adapted to contact the lower surface of the horizontal flange 133 for the purpose of elevating the exhaust valve from contact with its seat.

Received around the top of the stem of the exhaust valve is the collar 134 whose L-shape flange 135 is utilized as a spring retainer and is adapted to receive the lower end of the exhaust coil spring 77.

The exhaust valve head 136, integrally formed with the lower end of the stem of the exhaust valve, is curved outwardly whereby the internal pressure exerted against the walls of the head is adapted to be equalized with respect to upward and lower pressure.

An important advantage of the invention is that, when the exhaust valve 73 is in open position, as shown in Fig. 4, the burned fuel gases when escaping from the port 5, in the head 3, are adapted to contact the walls 126 and thereby be deflected from contact with the valve stem 123, thereby maintaining the exhaust valve stem at relatively low temperature and prevent deposit of carbon in the clearance between valve guide and the stem.

Another advantage of the invention is that the pressure necessarily exerted upwardly by the end 84 of the rocker arm 83 may be regulated as by varying the area of the walls 125 and 126 in accordance with the desire of the manufacturer.

Still another advantage of the invention is that the inlet charge passes through the chamber 20 and thereby contacts the exhaust valve head 106, as well as creating current around the intake valve stem, its support, and the body portion of the pressure guide, whereby these various parts are maintained at a relatively low temperature with the result that the same will be easily and readily lubricated.

Still another advantage of the invention is that the area of the port 5 may be regulated for the purpose of assisting in reducing the power necessary to eject the burned fuel gases from the combustion chamber and at the same time permit such burned fuel gases to be ejected from the combustion chamber almost instantly.

Still another advantage of the invention is that the engine is adapted to operate relatively silent particularly because of the arrangement and construction of the various parts and, also, because the cam plate 95 is maintained at all times in continuous contact with the exhaust cams, as by an economical mechanical structure which employs use of the usual oil pressure customarily utilized to pump oil to the various bearings of the engine.

Still another advantage of the invention is that the charge of fuel which is injected through the chamber 29 and into the combustion chamber 19 passes through the heated exhaust valve head 106, thereby assisting in evaporating the charge so that when the fuel reaches the combustion chamber it is thoroughly evaporated and therefore is adapted to effect maximum power when exploded within the chamber by the usual spark plug.

While I believe that the form of the invention illustrated in the drawings and referred to in the above description, as the preferred embodiment, is efficient and practicable, yet realizing that the conditions concurrent with the adoption of the device will necessarily vary, I desire to emphasize the fact that changes in the details may be resorted to, when required, without sacrificing any of the advantages of the invention as defined in the claims.

Various changes may be made in the general form and arrangement of mechanical parts described without departing from the invention. Hence I do not limit myself to the precise details of the materials or the size and shape thereof as set forth, but consider myself at liberty to make such changes and alterations as fairly fall within the spirit and scope of the appended and final claims.

What I claim as new and desire to secure by Letters Patent is:

1. The combination with an internal combustion engine having a block having a cylinder therein, of a head having a hole therein vertically aligned with said cylinder, a hollow exhaust valve mounted slidably in said hole and having its upper and lower ends constricted and having an enlarged head intermediate its ends, an intake valve mounted slidably within said exhaust valve and means to operate said valves, substantially as and for the purposes described.

2. In an internal combustion engine, an engine body including a cylinder block and a head, a piston in the cylinder of the block, said body having an inlet passageway leading to the cylinder and having an exhaust passageway leading from said cylinder, and concentrically disposed and independently operated inlet and exhaust valves for controlling the respective passageways, said exhaust valve having constricted ends and an enlarged head intermediate said ends, the diameters of said exhaust valve ends and of said exhaust valve head capable of being varied to assist and resist said first mentioned means.

3. The combination with an internal combustion engine having a block having a cylinder therein and a reciprocating piston in said cylinder, of a head, an operative hollow exhaust valve mounted in said head having its upper and lower ends constricted and having an enlarged head intermediate its ends, an intake valve mounted slidably within said exhaust valve and operated independently of said exhaust valve and means to admit an inlet charge into said enlarged head and from said head through said lower constricted end into said cylinder.

4. In an internal combustion engine, an engine body including a cylinder block and head, a piston in said cylinder, said body including an opening entering the top of the cylinder thereof concentric therewith and including a valve seat, a tubular exhaust valve slidably mounted in said opening, said engine body including an inlet passageway communicating with said cylinder through said tubular exhaust valve, said exhaust valve including a head portion engageable with said seat, said head constituted by an outwardly enlarged portion of the tubular valve, means for operating said valve relative to the seat, an intake valve slidably mounted within said exhaust valve, a tubular internal support for said exhaust valve including a seat at its lower end engageable by the head of said intake valve, and means for operating said intake valve relative to its seat.

5. In an internal combustion engine, an engine body including a cylinder block and head, a piston in the cylinder of said body, said body including an opening entering the top of and concentric with said cylinder and including a valve seat, a tubular exhaust valve support mounted on the body, a tubular exhaust valve telescopically mounted on said support including a head engaging said seat, said body including an exhaust passageway extending from said opening, said engine body including an inlet passageway communicating with the interior of said tubular exhaust valve, an inlet valve mounted in said support, said support including an inlet valve seating surface at its lower end adjacent the head of the exhaust valve, said tubular exhaust valve providing a bulged end forming the head thereof and providing an annular space and a tapered end wall for seating contact with the exhaust valve seat, said inlet valve having its head disposed immediately adjacent said annular space, whereby the inlet gases are directed in the annular space and against the closed walls thereof and against the inwardly tapered end wall of the exhaust valve.

6. In an internal combustion engine, a body including a cylinder block and head, a piston in said cylinder, said engine body including an exhaust passageway extending from the upper end of the cylinder of said block, a tubular valve support and guide element mounted on the body and extending adjacent said exhaust passageway concentric with said cylinder, a tubular exhaust valve telescopically mounted on said support and guide element, said engine body including a seat for said exhaust valve within the exhaust passageway, an inlet passageway for said cylinder communicating therewith through said tubular support and guide element, an inlet valve slidably supported in said element, said element including a seat on its lower end adapted to be engaged by the head of said inlet valve, and said exhaust valve including an enlarged portion at its head end providing an annular space, and a constricted inlet, whereby the incoming gases are directed into the annular space contacting the internal walls thereof and being deflected toward the center of the cylinder because of the constricted outlet end of the exhaust valve.

7. In an internal combustion engine, an engine body including a cylinder block and head, a piston in said cylinder, said engine body including an exhaust passageway extending from said cylinder, and an inlet pasageway extending to said cylinder, an inlet valve controlling said inlet passageway, a tubular exhaust valve controlling said exhaust passageway, said inlet passageway entering said cylinder through said tubular exhaust valve, said engine body including a seat for said exhaust valve in said exhaust passageway, and said exhaust valve including a bulged head end and a constricted outlet opening, a seat element for said inlet valve adjacent said bulged portion, whereby the incoming gases are deflected outwardly into the bulged portion and inwardly to pass out of the constricted opening.

8. In an internal combustion engine, an engine body including a cylinder block and head, a piston in the cylinder of said block, said body having an inlet passageway to said cylinder and an exhaust passageway from said cylinder, and concentrically disposed inlet and exhaust valves for controlling the respective passageways, said exhaust valve having a bulged end forming the head thereof including inclined end walls and providing a constricted end opening, whereby the areas of said end walls can be varied for controlling the internal forces acting on said exhaust valve.

VICTOR F. ZAHODIAKIN.